United States Patent [19]

Langdon

[11] Patent Number: 5,136,830
[45] Date of Patent: Aug. 11, 1992

[54] LAWN MOWERS INCLUDING LIFT HANDLES

[76] Inventor: Christopher D. Langdon, Box 904, Tryon, N.C. 28782

[21] Appl. No.: 666,573

[22] Filed: Mar. 8, 1991

[51] Int. Cl.$^5$ .............................................. A01D 75/20
[52] U.S. Cl. ................................. 56/320.1; 56/DIG. 9; 56/DIG. 18; 294/26
[58] Field of Search .................. 56/16.7, 320.1, 320.2, 56/DIG. 9, DIG. 18, DIG. 20, DIG. 24; 294/15, 26

[56] References Cited

U.S. PATENT DOCUMENTS

| | | | |
|---|---|---|---|
| 2,963,842 | 12/1960 | Estes | 56/320.1 |
| 3,564,823 | 2/1971 | Rhoads | 56/16.7 |
| 4,098,442 | 7/1978 | Moore | 294/26 X |
| 4,152,884 | 5/1979 | Gardrud et al. | 56/320.2 X |
| 4,178,977 | 12/1979 | Sur et al. | 56/320.1 |
| 4,265,079 | 5/1981 | Hoffmann | 56/202 |
| 4,463,977 | 8/1984 | Wyatt | 294/26 |
| 4,482,181 | 11/1984 | Shepherd | 294/26 |
| 4,630,838 | 12/1986 | Stockton | 280/47.17 |
| 4,637,203 | 1/1987 | Fedeli | 56/320.2 X |
| 4,702,063 | 10/1987 | Satoh et al. | 56/202 |
| 4,953,904 | 9/1990 | Danboise | 294/15 |

FOREIGN PATENT DOCUMENTS 2063635  6/1981  United Kingdom ......... 56/DIG. 18

*Primary Examiner*—Terry Lee Melius
*Attorney, Agent, or Firm*—John K. Donaghy

[57] ABSTRACT

A rotary lawn mower adapted to be moved over a surface to mow vegetation; said lawn mower includes a mower deck, a motor, rotary cutting means and a lift handle assembly; said mower deck including a top portion adapted to support said motor and downwardly extending edge portions; said motor being affixed to the central portion of said mower deck and coupled to drive said rotary cutter means positioned underneath said mower deck and substantially parallel to said surface, said lift handle assembly, being selectively positioned on at least opposed sides of said motor means and adapted to be attached to said mower deck thus permitting a user of said mower to selectively grasp said lift handle assembly to move said rotary mower from one location to another.

4 Claims, 2 Drawing Sheets

LAWN MOWERS INCLUDING LIFT HANDLES

BACKGROUND OF THE INVENTION

The invention relates to lawn mowers and, more particularly, to rotary lawn mowers including a lift handle assembly affixed to the mower deck.

DESCRIPTION OF THE PRIOR ART

Rotary type lawn mowers are widely used and well known in the prior art. In general, the prior art rotary lawn mowers have included a mower deck having a top surface for supporting the motor. Also the mower deck generally included downwardly extending edges. A cutting blade coupled to the motor shaft rotates between the mower deck and the ground. Wheels were attached to the deck using a variety of techniques. A push handle was generally provided to permit the user to propel the mower along the ground to mow vegetation. None of these prior art mowers included lift handle means permitting one or more persons to lift the mower to conveniently place the mower in storage or in a vehicle for transportation, for example.

SUMMARY OF THE INVENTION

The invention provides a rotary lawn mower including a mower deck, a motor, cutting means and a lift handle assembly. More specifically, the mower deck includes downwardly extending edge portions and a top portion adapted to support the motor. The motor is affixed to the central portion of the mower deck and coupled to drive the rotary cutter positioned underneath the mower deck and substantially parallel to the ground. A lift assembly means is provided which extends above the top surface of the mower deck a convenient distance, permitting one or more persons to conveniently lift the mower to place it in storage or in any other location desired. Alternately, the lift handles may be molded as a part of the mower deck.

DETAILED DESCRIPTION

Figure 1:
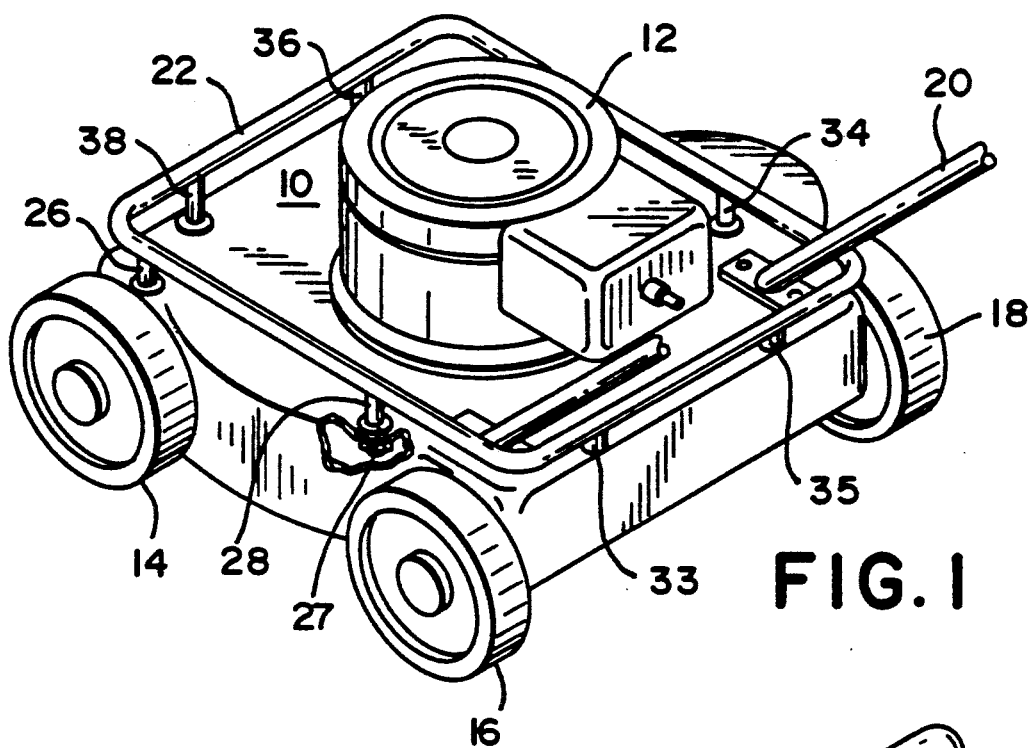
FIG. 1 is a pictorial drawing illustrating a first embodiment of the invention.

FIG. 1 is a pictorial view of one embodiment of the invention. Generally, the rotary lawn mower includes a mower deck 10 having a substantially flat upper portion and downwardly extending edge portions. A motor 12 is affixed to the top surface of the mower deck 10 with the drive shaft extending vertically and downwardly through the upper flat portion of the mower deck 10. A rotary blade is affixed to the lower end of the drive shaft in a conventional manner. Four wheels with three of the wheels typically illustrated at reference numerals 14, 16, and 18 are affixed to opposite edges of the mower deck. The fourth wheel is not visible in this view. In operation, the operator pushes on a handle 20 to propel the mower along the ground to mow vegetation. Further detailed illustration of the wheels is not required because these features are typical of the prior art.

In accordance with the invention, a lift handle assembly including a rail-like lift handle member 22, is affixed by any suitable means to and positioned above the upper surface of the mower deck 10. In the illustrated embodiment, the rail-like handle member 22 has its ends attached together, extends around the central portion of the mower and has a generally rectangular inner perimeter. Proper balance of the mower requires that the center of mass of the mower be positioned within the inner perimeter of the rail-like member 22. When so designed, the user can grasp the lift handle means 22 along opposed edges of the mower and lift the mower to position it in any convenient location, such as the trunk of an automobile or in a suitable storage location.

More specifically, the lift handle assembly 22 includes an elongated rail-like member 22 having a circular cross-section. A plurality of downwardly extending vertical support portions 26, 28, 33, 35, 34, 36 and 38, are attached to the rail-like member 22. Each of these vertical support portions includes a shoulder 27. Suitable openings are provided in the top portion of the mower deck 10 such that the vertical support portions extend therethrough with the shoulders mating with the upper surface of the mower deck 10. Suitable means, such as a conventional nut, mates with the vertical support portions to hold the lift handle assembly 22 in the desired position with respect to the mower deck 10.

When it is desired to physically move the entire lawn mower from one location to another, the lift handle assembly 22 may be grasped at one or more locations and the mower lifted to move the mower as required. For example, if during the move it is desired to independently control the positions of opposed sides of the mower, the lift handle assemble 22 is grasped at two locations along opposed sides of the mower such that the mower is substantially balanced.

Proper balance is assured due to the relationship between the rail-like member 22 of the lift handle assembly and the center of mass of the mower described above. Two or more individuals may similarly use the lift handles to move the mower. Also the lift handle assembly may be gripped at a single location and used to move the mower when it is not necessary or desirable to independently control the position of opposed edges of the mower deck 10. That is, when the lift handle assembly is grasped at a single location the mower will tend to rotate around the point at which the lift handle assembly is grasped. Under these circumstances, the degree of rotation will be determined by the weight distribution of the mower.

Figure 2:
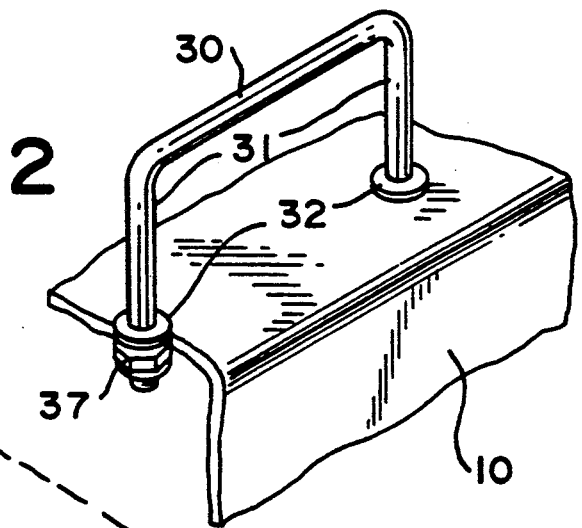
FIG. 2 illustrates an alternate embodiment of the lift handle assembly.

FIG. 2 illustrates an alternate embodiment of the lift handle assembly. In this embodiment, the lift handle assembly includes a plurality of generally "U" shaped lift handles each including a substantially straight top portion 30 and two downwardly extending side portions 31. Each of the downwardly extending side portions 31 includes a shoulder collectively illustrated at reference numeral 32. Suitable openings are provided in the mower deck 10 for the side portions of the lift handle means to extend therethrough such that the shoulder 32 mates with the top surface of the mower deck 10. Suitable means, such as a conventional nut 37, are utilized to secure the lift handle 30 in the desired location.

In utilizing this embodiment of the invention, a lift handle of the type illustrated at reference numeral 30 is selectively placed at strategic locations along the upper surface of the mower deck 10 to form the lift handle assembly. That is, the lift handle may be placed along two sides of the mower deck or at any other desired location or locations. The exact location of each of the lift handles comprising the lift handle assembly is selected to maintain the proper balance of the mower as it is lifted using the lift handles.

By so placing the lift handles 30 to form a lift handle assembly, it is obvious that a plurality of these lift handles will collectively function in a substantially identical manner to the embodiment illustrated in FIG. 1 and described above.

Figure 3:
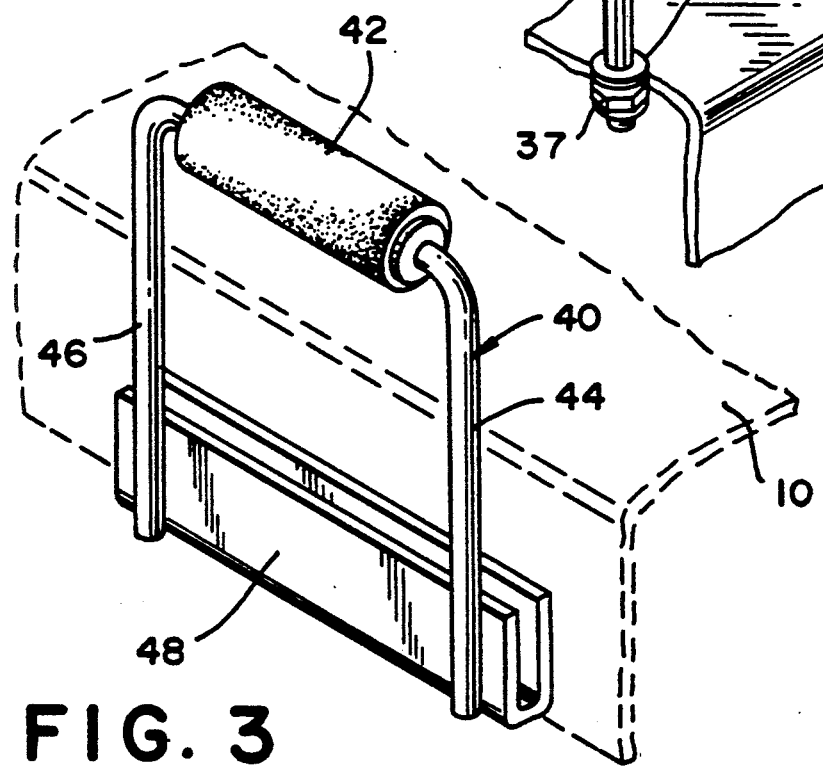
FIG. 3 illustrates a second alternate lift handle assembly.

FIG. 3 illustrates still another alternate embodiment of the invention. In this embodiment, the lift handle assembly comprises a plurality of lift handles typically illustrated at reference numeral 40. Each of the lift handles includes a substantially flat top portion surrounded by a grip 42. The material for the grip is selected to increase the comfort in using the lift handles. Functionally, the grip 42 may increase the size of the lift handle to increase the comfort of the user. Additionally, the material of the grip may be selected to be soft to further increase the comfort of the user. Other comfort features may also be included.

Additionally, the lift handle 40 also includes two downwardly extending side portions 44 and 46 which are attached using any convenient means to a generally "U" shaped horizontal channel member 48. Horizontal channel member 48 generally extends substantially parallel to the upper portion 42 and is adapted to mate with the downwardly extending edge portions of the mower deck 10 permitting these lift handles to be utilized to conveniently lift the mower. That is, when not in use the lift handles comprising this embodiment of the invention can be removed from the mower deck.

In this embodiment of the invention, a plurality of lift handles 42 is positioned at strategic locations around the mower deck 30. It is obvious that a lift handle assembly so formed functions in a substantially identical manner to the lift handle assembly illustrated in FIG. 1.

Figure 4:
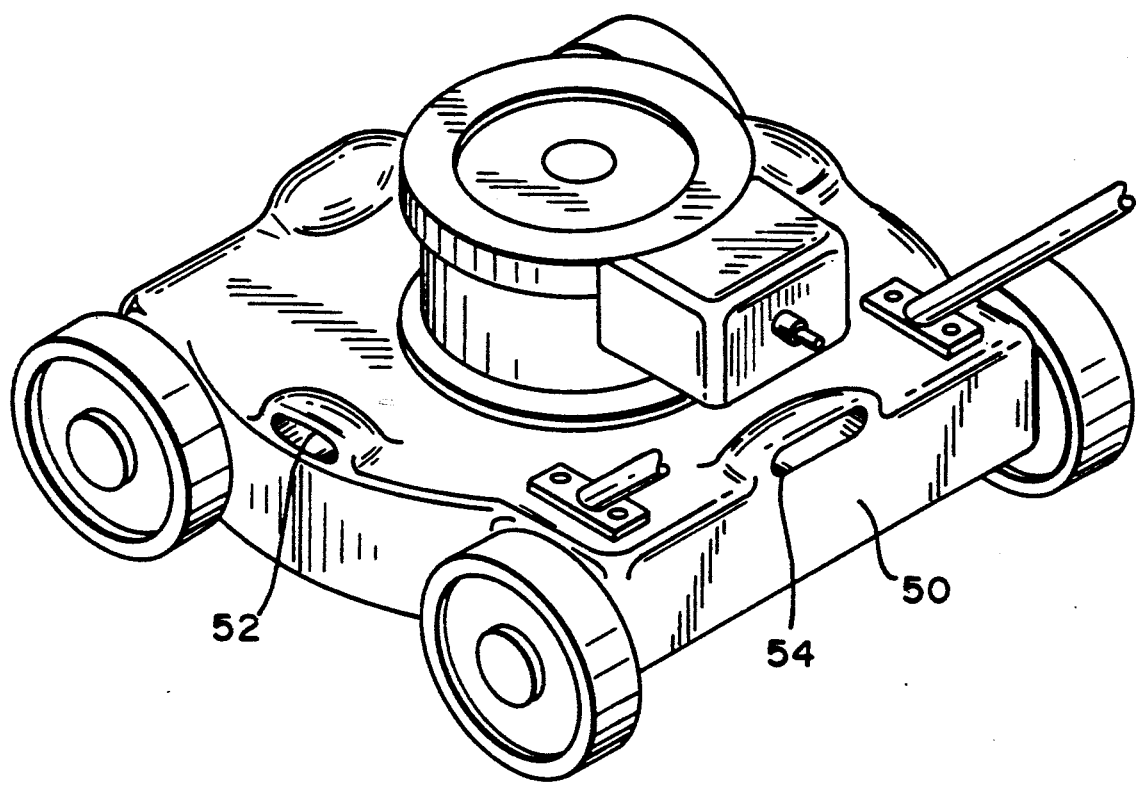
FIG. 4 illustrates another embodiment of the invention in which the handles are molded as a part of the mower deck.

FIG. 4 illustrates an alternate embodiment of the invention in which lift handles comprising the lift handle assembly are molded into the mower deck 50. Generally, it is contemplated that the mower deck 50 will be molded of a light material such as aluminum. Suitable lift handles, typically illustrated at reference numerals 52 and 54 are positioned along the edges of the mower deck 50. In FIG. 4 a single lift handle has been illustrated along each edge of the mower deck 50. It is obvious that additional lift may be provided along each of the sides. A plurality of lift handles comprise a lift handle assembly which functions as the lift handle assembly illustrated in FIG. 1.

I claim:

1. A rotary lawn mower adapted to be moved over a surface to mow vegetation; said lawn mower includes a mower deck, a motor, rotary cutting means and a lift handle assembly; said mower deck including a top portion adapted to support said motor and downwardly extending edge portions; said motor being affixed to the central portion of said mower deck and coupled to drive said rotary cutting means positioned underneath said mower deck and substantially parallel to said surface, said lift handle assembly, comprising a top portion and downwardly extending side portions having shoulders, being selectively positioned on at least opposed sides of said motor means and adapted to be attached to said mower deck by said downwardly extending side portions extending therethrough such that said shoulders rest on the deck and fastening means on the side portions secure same to the deck thus permitting a user of said mower to selectively grasp said lift handle assembly to move said rotary mower from one location to another.

2. A rotary lawn mower adapted to be moved over a surface to mow vegetation; said lawn mower having a center of mass and including a mower deck, a motor, rotary cutting means and a lift handle assembly; said mower deck including a top portion adapted to support said motor and downwardly extending edge portions, said motor being affixed to the central portion of said mower deck and coupled to drive said rotary cutting means positioned underneath said mower deck and substantially parallel to said surface; said lift handle assembly including a rail-like member extending around said motor in a closed path such that said rail-like member has a closed inner perimeter with said center of mass of said lawn mower positioned within said inner perimeter of said rail-like member and attached to said mower deck such that a user of said mower may grasp said lift handle assembly to move said rotary mower from one location to another such that the position of opposed edges of said mower deck may be independently controlled as said rotary lawn mower is moved.

3. A rotary lawn mower in accordance with claim 2 wherein said lift handle assembly comprises an upper rail-like portion having its ends attached together to form an inner perimeter positioned above said mower deck with the center of mass of said mower being within said inner perimeter such that a user of said lawn mower may grasp said lift handle assembly to move said mower.

4. A rotary lawn mower in accordance with claim 2 wherein said lift handle assembly also includes a plurality of downwardly extending portions each adapted to be attached to said rail-like portion and to said mower deck.

* * * * *